US007730126B2

(12) United States Patent
Crawford

(10) Patent No.: US 7,730,126 B2
(45) Date of Patent: Jun. 1, 2010

(54) SYSTEMS AND METHODS FOR CONTROLLING ACCESS WITHIN A SYSTEM OF NETWORKED AND NON-NETWORKED PROCESSOR-BASED SYSTEMS

(76) Inventor: C. S. Lee Crawford, 12132 Terrazzo La., Frisco, TX (US) 75035

( * ) Notice: Subject to any disclaimer, the term of this patent is extended or adjusted under 35 U.S.C. 154(b) by 561 days.

(21) Appl. No.: 11/684,673

(22) Filed: Mar. 12, 2007

(65) Prior Publication Data

US 2007/0156912 A1 Jul. 5, 2007

Related U.S. Application Data

(63) Continuation-in-part of application No. 11/424,644, filed on Jun. 16, 2006, and a continuation-in-part of application No. 10/368,311, filed on Feb. 15, 2003, now Pat. No. 7,194,637.

(60) Provisional application No. 60/691,383, filed on Jun. 18, 2005, provisional application No. 60/359,549, filed on Feb. 25, 2002.

(51) Int. Cl.
*G06F 15/16* (2006.01)
*G06F 15/173* (2006.01)

(52) U.S. Cl. ...................................... 709/203; 709/223

(58) Field of Classification Search ................. 709/217, 709/223, 225, 229, 203
See application file for complete search history.

(56) References Cited

U.S. PATENT DOCUMENTS

| | | | | |
|---|---|---|---|---|
| 6,001,016 | A * | 12/1999 | Walker et al. | 463/42 |
| 6,178,510 | B1 * | 1/2001 | O'Connor et al. | 726/5 |
| 6,505,772 | B1 * | 1/2003 | Mollett et al. | 235/379 |
| 6,645,077 | B2 * | 11/2003 | Rowe | 463/42 |
| 7,198,571 | B2 * | 4/2007 | LeMay et al. | 463/25 |
| 2004/0032485 | A1 * | 2/2004 | Stephens, Jr. | 348/14.08 |

* cited by examiner

*Primary Examiner*—Hussein A. Elchanti

(57) ABSTRACT

In one embodiment, access log information is written to portable cards of end-users of system that includes networked and non-networked processor based systems that control user access. In conjunction with processing of access attempts by non-networked processor-based systems, time stamps of accesses by each end-user for multiple accesses on multiple processor-based systems are analyzed against one or more access rules, the one or more rules defining one or more relative timing constraints or order constraints for accesses on multiple processor-based systems. Also, in conjunction with processing of the further access attempts by the non-networked processor-based systems, access decisions are controlled in response to determining whether the time stamps of respective end-users indicate that said respective end-users have violated the one or more access rules.

16 Claims, 5 Drawing Sheets

SYSTEMS AND METHODS FOR CONTROLLING ACCESS WITHIN A SYSTEM OF NETWORKED AND NON-NETWORKED PROCESSOR-BASED SYSTEMS

RELATED APPLICATIONS

The present application is a continuation-in-part of U.S. patent Ser. No. 11/424,644, filed Jun. 16, 2006 (which claims the benefit of U.S. Provisional Application No. 60/691,383, filed Jun. 18, 2005) and is a continuation-in-part of U.S. patent application Ser. No. 10/368,311, filed Feb. 15, 2003 now U.S. Pat. No. 7,194,637 (which, in turn, claims the benefit of U.S. Provisional Application No. 60/359,549 filed Feb. 25, 2002), all of which are incorporated herein by reference.

BACKGROUND

Limiting access to relevant resources and protected areas to authorized individuals may be important in many circumstances, such as in the case of access to an airport, military installation, office building, etc. Traditional doors and locks can be used for protection of sensitive areas. However, doors with traditional locks and keys may be cumbersome to manage in a setting with a large number of users. For instance, once an employee is fired, it may be difficult to retrieve the physical keys the former employee was issued while employed. Moreover, there is a possibility that copies of such keys were made and never surrendered.

"Smart" doors provide access control to sensitive areas. A smart door may be equipped with a key pad through which a user enters his/her PIN or password. The key pad may have an attached memory and/or elementary processor in which a list of valid PINs/passwords may be stored. Thus, a door may check whether the currently entered PIN belongs to the currently valid list. If so, the door may open. Otherwise, the door may remain locked. Of course, rather than (solely) relying on traditional keys or simple key pads, a more modern smart door may work with cards or other portable devices with various types of memory. Such cards or devices may be used in addition to or instead of traditional keys or electronic key pads. Such magnetic-strip cards, smart cards or contactless devices may have the capability of storing information that is transmitted to the doors. More advanced cards may also have the ability of computing and communicating. Corresponding devices on the doors may be able to read information from the cards, and perhaps engage in interactive protocols with the cards, communicate with computers, etc.

Smart doors can possess various connectivity levels. A fully networked door is one that is at all times connected with some database (or other computer system). For instance, the database may contain information about the currently valid cards, users, PINs, etc. In some instances, to prevent an enemy from altering the information flowing to the door, such connection is secured (e.g., by running the wire from the door to the database within a steel pipe). On the other hand, a totally non-networked door does not communicate outside of its immediate vicinity. In between these two extremes, there may be doors that have intermittent network-capability (e.g., a wirelessly connected "moving" door that can communicate with the outside only when within range of a ground station, such as the door of an airplane or a truck).

Traditional access control mechanisms suffer from many drawbacks. Fully networked doors may be very expensive. The cost of running a secure pipe to a distant smart door may vastly exceed the cost of the smart door itself. Protecting a wire cryptographically, while possibly cheaper, still has its own costs (e.g., those of protecting and managing cryptographic keys). Moreover, cryptography without steel pipes and security guards cannot prevent a wire from being cut, in which case the no-longer-networked door may be forced to choose between two extreme alternatives: namely, remaining always closed or always open, neither of which may be appropriate or practical. In any case, a fully networked door is often not a viable option.

Non-networked smart doors may be cheaper than connected doors. However, traditional approaches to smart doors have their own problem. Consider, for instance, a non-networked smart door capable of recognizing a PIN. A terminated employee may no longer be authorized to go through that door; yet, if he still remembers his own PIN, he may have no trouble opening such an elementary smart door. Therefore, it would be necessary to "deprogram" the PINs of terminated employees, which is difficult for disconnected doors. Such a procedure may be very cumbersome and costly, e.g., an airport facility may have hundreds of doors and dispatching personnel to reprogram all of such doors can be impractical.

DETAILED DESCRIPTION

Figure 1:
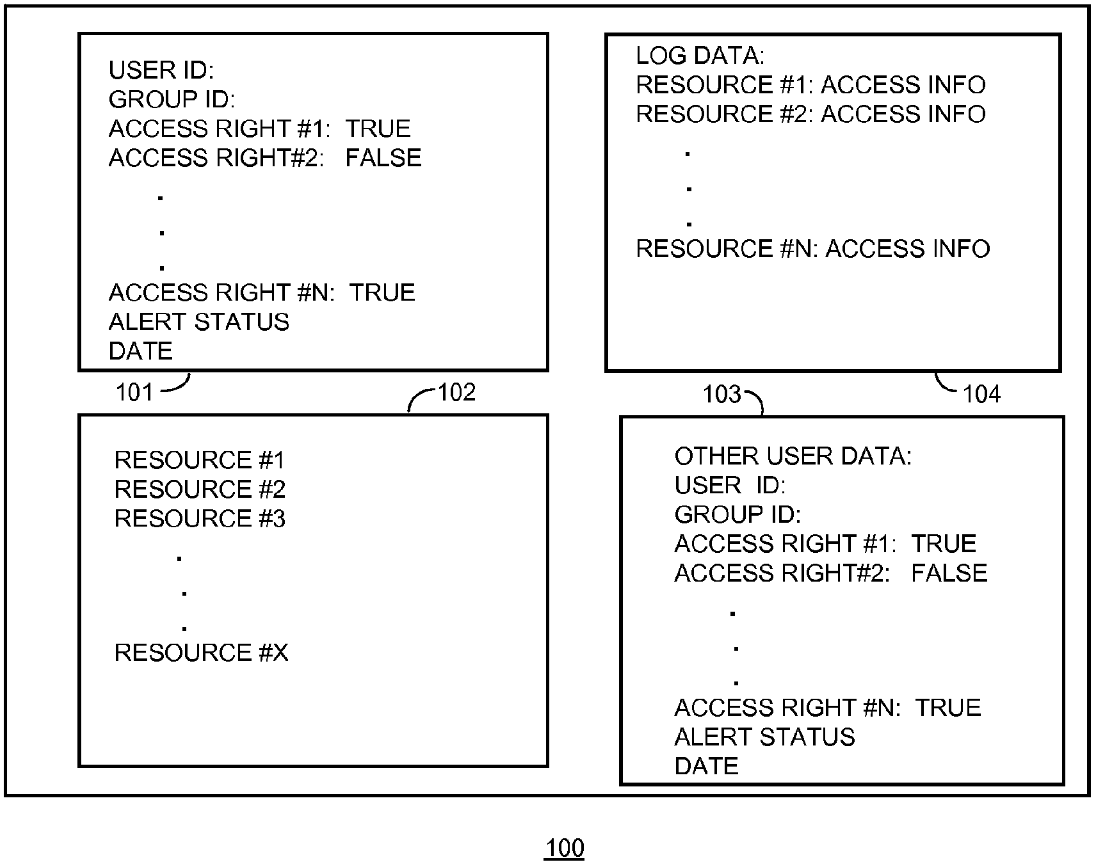
FIG. 1 depicts an access card according to one representative embodiment.

Representative embodiments are directed to systems and methods for controlling access within a secured facility. In some representative embodiments, access control is implemented using a system of multiple processor-based systems that allow or deny access according to rules, permissions, proofs, etc. A processor-based system is disposed at each object or resource (e.g., door, equipment, computer, particular software, etc.) to which access is controlled. The processor-based system may include a card reader that reads an access card and processes the relevant access information. Based upon the processing, the processor-based systems may keep a door closed, open a door, provide access to the desired resource, deny access to the resource, etc.

In some embodiments, some of the processor-based systems are networked, i.e., have the capacity of communicating over a suitable communications network such as an ethernet network, the Internet, a Wi-Fi network, any suitable combination of networks, etc. The networked processor-based systems utilize their network communication functionality to communicate with a central access control security server. The network communication allows the networked processor-based system to obtain the most up-to-date rules, permissions, proofs, etc. to make the access control decisions.

Some of the processor-based systems are non-networked, i.e., do not possess the functionality to communicate over a network or do not possess a network connection. The non-networked status may be intermittent, temporary, or persistent. Some representative embodiments utilize the access control cards of the users of the system to distribute updated rules, permissions, proofs, etc. In some representative embodiments, "revocation" information is written to user cards at various points (e.g., at networked processor-based systems), the revocation information from the user cards is read by non-networked processor-based systems and is stored locally by the non-networked processor-based systems. Revocation information refers to information that revokes the previously issued or otherwise valid rights of a user to access one, several, or all objects/resources within the secured facility.

As an example, suppose the employment of a first user is terminated and the user's access rights are revoked by updating information in the central access control security server. The first user's identification is added to a "revocation" list on the server. When a second user accesses a processor-based system within the secured facility, the revocation list is written to the second user's access card (assuming that the revocation list was not previously written to the second user's card at a different networked processor-based system). Specifically, the networked processor-based system checks the central access control security server for the most recent revocation information and writes the information to the second user's card. Then, as the second user traverses his/her way through the secured facility, non-networked processor-based systems read the revocation list from the second user's card and store the revocation information locally. If the first user attempts to access any of the doors or other objects within the secured facility that the second user has accessed after obtaining the revocation list, the first user will be denied access.

It shall be appreciated that the revocation information can be written to multiple users' access cards. Then, as the multiple users traverse their way through the secured facility, the updated access information is quickly and efficiently distributed throughout the system. Additionally, non-networked processor based systems can also write the updated revocation or other access information to users' cards. That is, the second user may only go "half-way" through the secured facility. Other users that present their cards to non-networked processor-based systems that processed the second user's card can have the updated information written to cards of the other users. Thereby, the distribution of the updated access information is accelerated through the secured facility.

In some embodiments, a history of access information is maintained by non-networked processor based systems. Portions of the history of access information can be written to users' cards so that when the users interact with networked processor based systems, the information stored on the users' cards can be retrieved and communicated to the central security server. Various algorithms can be used to select the specific information to be written to the users' card, e.g., to prioritize the information to be forwarded. Additionally, cryptographic processing and/or error correction code (ECC) processing can be applied to multiple portions of access history information. By performing such processing, if a subset of the access history portions are available, all of the access history information can be recovered. Also, a random number generator can be used to select the information to be written to users' cards and/or to control when the information is written to reduce the ability of malicious individuals from intercepting specific access history information.

In some embodiments, an access history is written to users' cards as they access objects within the secured facility. The history information can be used to determine (without, necessarily, accessing the central security server) whether users have engaged in inappropriate or suspicious activities. Specifically, non-networked processor based systems can examine this access history to determine whether to provide or deny access by comparing the access history against predefined rules. Alternatively, the users cards can be flagged for increased attention at various manned security locations within the secured facility.

In some embodiments, an access control device stores a representation of part or all of a secured facility. The access control device can also store path and tolerance data defining acceptable/permitted paths for users or groups of users for traversing the secured facility. The tolerance data may define acceptable deviations from the defined paths in case an individual takes a slightly but not-materially different path. When an end-user presents his or her card, the access control device compares the history of accesses as reflected on the end-user's card to the path information. If the information on end-user's card is not consistent with the permitted path information, access can be denied. By making access decisions in this manner, a number of inappropriate activities can be detected and remediated. For example, an end-user cannot use his/her card to enter a secured facility and then use another user's card to access highly secured areas/resources, because the other end-user's card will not possess the correct access history information. Other inappropriate activities can also be detected through such processing.

Referring now to the drawings, FIG. 1 depicts access card 100 according to one representative embodiment. Access card 100 can be physically implemented using commercially available cards and devices such as so-called "smart cards," magnetic cards, or any other handheld device possessing readable/writeable memory. Access card 100 differs from conventional cards in regard to the data stored in its memory (e.g., flash memory). Access card 100 preferably includes an interface for reading and writing information to and from the card. The communication may occur according to secured protocols, e.g., as preceded by an exchange of public keys between the card and another device. Access card 100 may include a CPU for performing processing activities (e.g., for authentication, for cryptographic processing, for internal memory management, etc.). Access card 100 may include volatile and non-volatile memory and may store software instructions for controlling the operations of the CPU.

As shown in FIG. 1, card 100 stores information 101 that indicates the access rights of the respective owner of card 100. The access rights may define the rights to doors, tools, equipment, vehicles, computers, particular software applications, etc. The access rights as shown in FIG. 1 are simple Boolean permissions. However, more complicated access right definitions could be defined (e.g., using a suitable mark-up language). Such access right definitions could define time dependent rules as an example. Also, information 101 may preferably include an identifier of the respective user (or alternatively a unique identifier of the card can be used as a proxy identifier for the user). As another example, a PKI key or other digital key could be used as a proxy for the identity of the user. Information 101 may also include a group identifier (e.g., an identifier for a particular group of personnel). Information 101 may also includes information that indicates that additional attention should be applied to the owner (e.g., if the owner has engaged in unusual or inappropriate activities). Card 100 also preferably comprises access history 102 that stores a list of the resources that the owner of card 100 has recently accessed or attempted to access, the time of the access, etc.

Card 100 also comprises access rights information 103 that defines the access rights for other end-users associated with the secured facility. Access rights information 103 can be used to revoke the rights of end-users other than the owner of the card 100. For example, when the owner of card 100 arrives at the secured facility and presents the card 100 to a networked processor-based system to gain access to the secured facility, revocation information can be written to the card 100 that indicates that the rights of one or more other users to one, several, or all resources/objects within the secured area are now revoked. Thus, as the owner of card 100 traverses his or her way through the secured facility, the revocation information can be distributed to the non-networked processor based systems in an efficient manner.

Card 100 also preferably stores log data 104. Log data 104 indicates when specific end-users associated with the secured facility have accessed particular resources. Log data 104 is preferably segmented into multiple portions and processed according to a cryptographic algorithm and error correction code (ECC) algorithm so that if only a subset of log data 104 is available (e.g., a malicious user has intercepted/erased some of the log data), all or substantially all of the access information can be recovered.

Suitable cryptographic processing may be applied to information 101 or other access information such as encryption or digital signatures to authenticate the validity of the data on access cards, access control devices, and/or the central security database/server.

Figure 2:
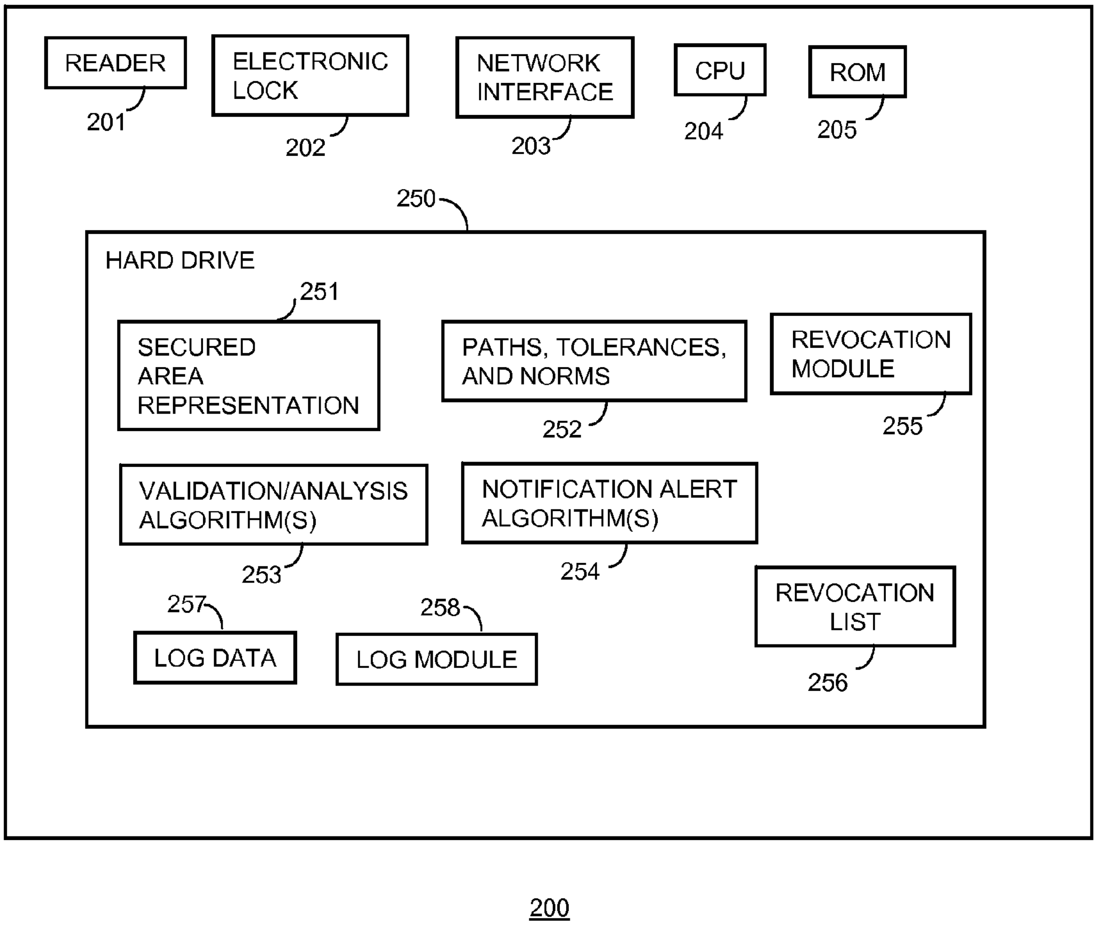
FIG. 2 depicts an access control device according to one representative embodiment.

FIG. 2 depicts access control device 200 according to one representative embodiment. Access control device 200 is preferably implemented as a processor-based system (including CPU 204) which operates according to software instructions stored in ROM 205 and/or hard drive 250. Access control device 200 includes reader 201 for communicating with, reading from, or writing to access cards 100 of end-users. Access control device 200 may also include lock 202 (e.g., a magnetic lock mechanism, a mechanical actuator lock, etc.) that implements the physical access control. Alternatively, lock 202 could implement suitable cryptographic means for controlling access to software, computers, or other processor resources (e.g., make an appropriate decryption key available). Access control device 200 may optionally include network interface 203 if access control device 200 is desired to function as a networked access control device.

Within hard drive 204 (or any other suitable non-volatile or volatile memory), a number of data structures and software files can be stored to facilitate the access decisions of electronic lock system 200.

In some embodiments, hard drive 204 stores validation/analysis algorithms 253 that read the data stored on a respective end-user's card 100, compares the data from the card to locally stored data, determines whether to allow access, and denies or provides access. The access decision may comprise determining whether the end-user should be given access by reading the access rights encoded on his/her card 100 and confirming the access rights using suitable cryptographic processing. In alternative embodiments, the end-user rights are stored within memory of access device 200 and access device 200 performs a look-up of those rights using a user identifier (e.g., the unique access card serial number) and/or a group identifier. The access decision may also involve analysis of the history of prior accesses/access attempts as recorded by data on the card 100 in view of secured access representation 251 and path, tolerances, and norm data 252 which will be discussed in greater detail below. Also, the access decision may involve determining whether the access rights retrieved from the end-user's card 100 has been revoked by comparison against revocation data list(s) 256.

In some embodiments, hard drive 204 stores revocation module 255. Revocation module 255 reads revocation data from access cards and stores revocation data in local revocation data list(s) 256. Also, revocation module 255 writes data from local revocation data list(s) 256 to access cards 100.

In some embodiments, hard drive 204 stores log module 258 which logs accesses and access attempts to log data file(s) 257. The log data file(s) 257 preferably detail the identifiers of end-users who have attempted to obtain access through access control device 200, times of access attempts, whether access was granted, etc. The log data is preferably replicated into multiple portions and an error correction code (ECC) processing is applied to the multiple portions. Also, cryptographic processing is preferably applied to the log data. Log module 258 preferably writes selected log data to access cards 100 as users attempt to obtain access through access control device 200. The log data can be prioritized (e.g., the most recent or most important data can be written first). Also, a random number generator function/routine can be used to control when to write data and/or what data to write. By employing the cryptographic processing, ECC processing, and random number generation, malicious individuals will find it much more difficult to intercept, modify, and/or destroy data before the data is communicated to the central security server.

Figure 3:
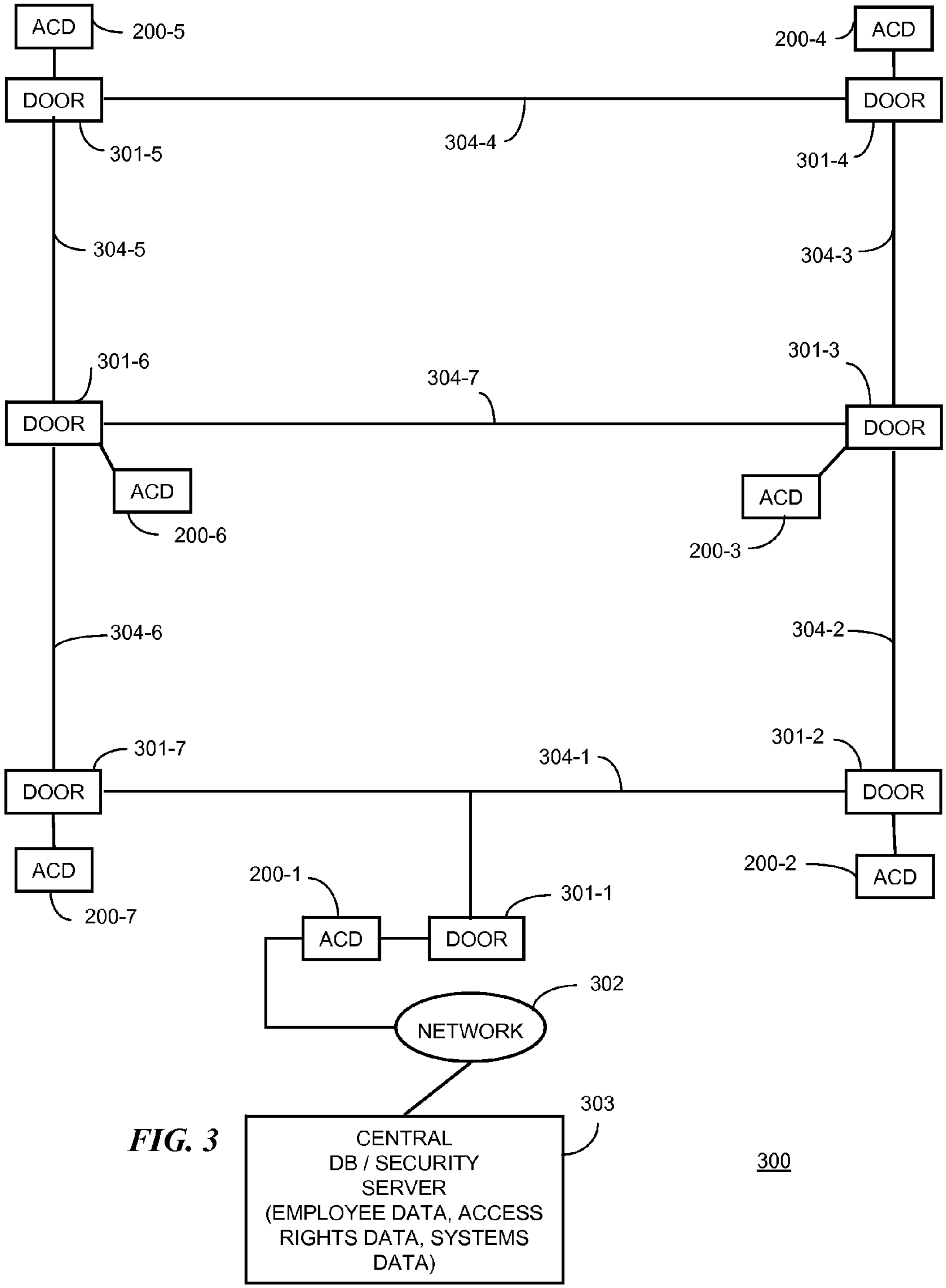
FIG. 3 depicts a secured facility according to one representative embodiment.

FIG. 3 depicts secured facility 300 according to one representative embodiment. The architecture and organization of secured facility 300 is by way of example. Any suitable architecture, organization, size, and complexity of a secured facility can be controlled by selected representative embodiments.

Secured facility 300 includes primary door 301-1 that is controlled by access control device 200-1. Access control device 200-1 is networked, e.g., is connected to central database/security server 303 through network 302. Central database/security server 303 preferably stores employee data, access rights data, system data (e.g., identification of access control devices within the system, whether the respective devices are networked or non-networked, etc.). When an end-user initially enters secured facility 300, the end-user can present his/her access card 100 and access control device 200-1 can determine whether the end-user is currently permitted to have access to secured facility 300 by communicating with database/server 303. If so, access control device 200-1 opens door 301-1. Otherwise, access control device 200-1 denies access. In some representative embodiments, security personnel can be stationed at door 200-1 to ensure that the end-user is not using some other end-user's card 100. For example, user photographs can be printed on the cards for review by security personnel or biometric information can be sampled. Also, in some embodiments, access control device 200-1 can write a suitable "permission" for the day (or other suitable amount of time) to the card 100 of the end-user that enables the end-user to access one, some, or all controlled resources within secured facility 300 for that day or other suitable period of time.

After the user enters door 301-1, the user enters hallway 304-1. Without regard to the access rules, rights, etc., the user can proceed to the right to door 301-2 or to the left to door 301-7. These doors are controlled by access control devices 200-2 and 200-7, respectively. From door 301-2, the end-user can proceed to door 301-3 through hallway 304-2; door 301-3 is controlled by non-networked access control device 200-3. From door 301-3, the end-user can proceed to door 301-4 (e.g., a multi-door unit that controls traffic in multiple directions) through hallway 304-3 or to door 301-6 through hallway 304-7. Doors 301-4 and 301-6 are controlled by non-networked access control devices 200-4 and 200-7, respectively. Doors 301-4 and 301-5 are connected by hallway 304-4. Door 301-5 is controlled by non-networked access control device 200-5. From door 301-5, the end-user can proceed to door 301-6 through hallway 304-5. Door 301-6 is controlled by non-networked access control device 200-6. From door 301-6, the end-user can proceed through hallway 304-6 to door 301-7. Clearly, the end-user can proceed through the hallways in either direction.

Now as the user initially enters secured facility 300, access control device 200-1 communicates with database/sever 303 and obtains recently updated revocation data. Access control device 200-1 then writes some or all of the revocation data to the access card 100 of the end-user. As the user traverses his/her way through secured facility 300, the revocation data on the user's card 100 can be distributed to the non-networked access control devices 200.

As previously discussed, access control devices 200 preferably utilize the path that a user has taken through the secured facility to determine whether to provide access. When end-user access of resources indicates an out-of-order access of access points, omission of one or several access point accesses, time limit violations, or other inappropriate actions, appropriate action can be taken such as denial of further access within secured facility 300.

Figure 4:
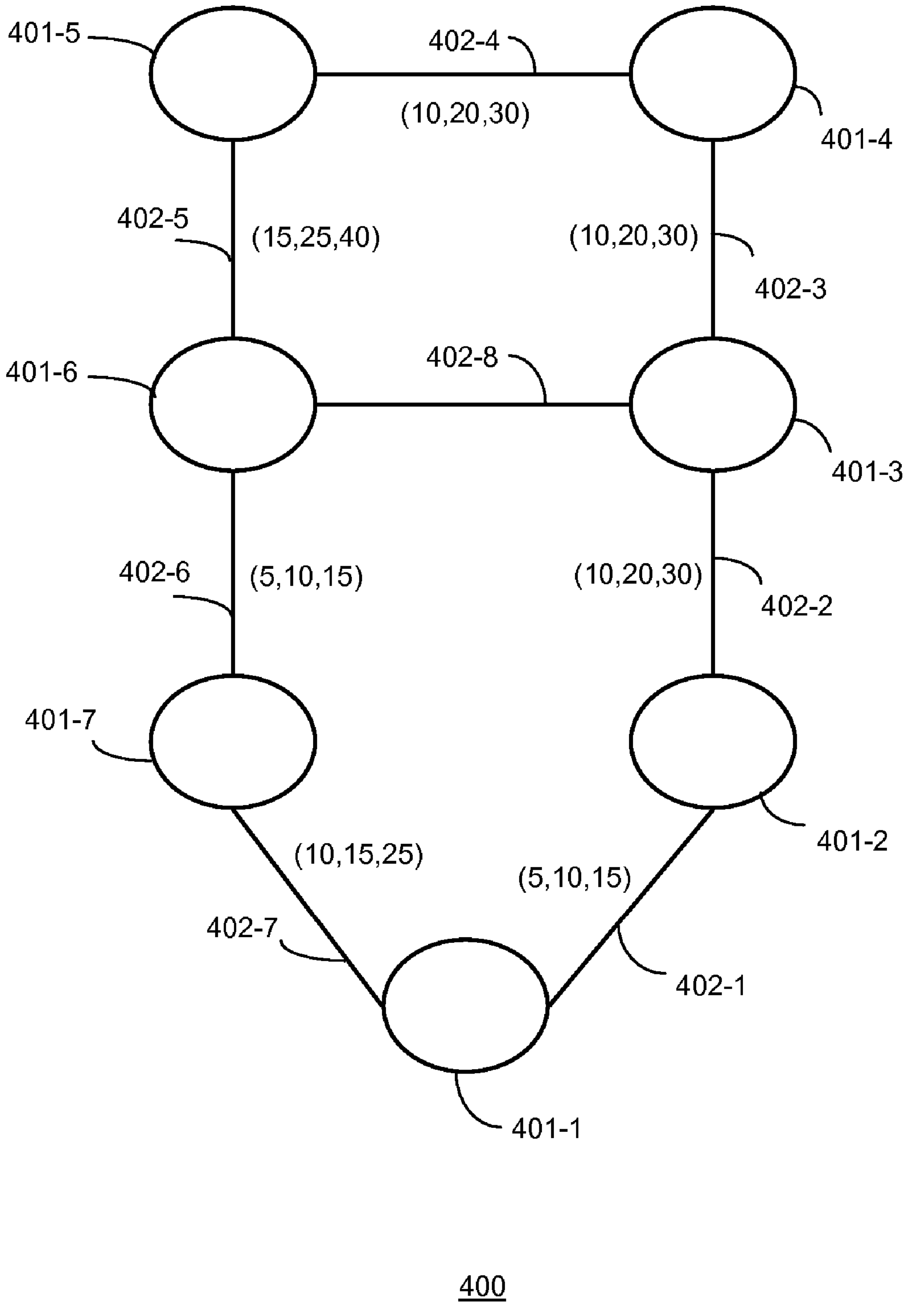
FIG. 4 depicts a digital representation of the secured facility according to one representative embodiment which may be stored (in whole or in part) within access control devices to facilitate access control decisions.

FIG. 4 depicts representation 400 of secured facility 300 according to one representative embodiment which may be stored (in whole or in part) within access control devices 200. Representation 400 represents the secured facility as a graph having nodes and edges. In one embodiment, a directed graph can also be utilized. Representation 400 includes node 401 which corresponds to the primary door 200-1 of secured facility 300. Each node is preferably implemented as a suitable data structure that stores an identifier of the access control unit 200 that controls the respective resources, stores an identifier of the type of resource, stores an identifier whether the resources is networked, non-networked, or intermittently networked, etc. From node 401, edge or link 402-1 represents the portion of hallway 304-1 that leads to door 200-2 and edge or link 402-7 represents the other portion of hallway 304-1. Each edge or link is preferably implemented by pointers or references that are stored in each respective node that point to or reference the data structures of connected nodes. Any suitable representation of secured facility 300 could be alternatively employed to store the appropriate information (e.g., tables, arrays, databases, relational databases, etc.).

Nodes 401-2 through 401-7 respectively represent doors 200-2 through 200-7. Edges or links 402-2, 402-3, 402-4, 402-5, 402-6, 402-7, and 402-8 respectively represent hallways 304-2, 304-3, 304-5, 304-5, 304-6, and 304-7. Each edge link can be associated with information that defines an amount of time used to traverse the hallways, passageways, distances between doors. For example, as shown in FIG. 4, the data (5, 10, 15) represents the minimum amount of time, the average time, and the maximum amount of time to proceed from door 301-1 to door 301-2.

Figure 5:
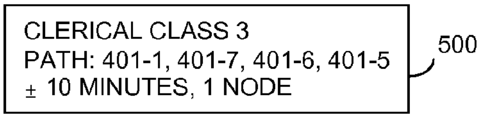
FIG. 5 depicts a permitted path data structure for a group of employees according to one representative embodiment.

Suppose a group of employees work in an office that is immediately past door 301-5 and accessible from hallway 304-4. FIG. 5 depicts permitted path data structure for such a group of employees. As shown in FIG. 5, data structure includes a group identifier ("CLERICAL CLASS 3"). The path that is authorized for this group of employees is defined by (401-1, 401-7, 401-6, and 401-5) as shown in FIG. 5. The error tolerance for these employees is given by ±10 minutes and one node. That is, if a particular end-user takes more than 10 minutes over a maximum amount of time to proceed from one node to another, the user can be flagged for increased supervisory attention (e.g., inspection) at an appropriate location. Additionally or alternatively, the user can be denied access to continue through additional doors. Other time tolerance parameters or security level rules can be used to make the decision whether to deny access upon deviation from the defined path information. A distance tolerance of 1 node is allowed for this group of employees. That is, an employee can deviate from the defined path by one node or door. For example, suppose a user could pass door 301-3 from door 301-6 but could not then proceed through door 301-4. The time and distance limitations can be enforced by comparing the node and time information stored on the user's access card to representation 400 and the path information in data structure 500.

In some representative embodiments, access control devices 200 are adapted to display the next appropriate link in the user's path as defined by suitable path information, permissions, user identity, group identity, and/or the like. Specifically, when a user presents his/her card 100 to an access control device 200, the device can display a map of a portion or all of the secured facility thereby graphically illustrating the path(s) that can/should be taken by the user. Access control devices 200 can also be adapted to display other information. For example, if a supervisor or security personnel presents his/her card 100 to an access control device 200, the individual can be given the option of reviewing individuals that have recently accessed the resource/door or attempted to access the resource/door. Also, to the extent that suspicious activity has been detected (e.g., out-of-bounds times of traversal from node to node), the access control device 200 can display alert information identifying the incident(s) and the users(s)/user card(s) associated with the incident(s).

The path definitions can be used to implement other appropriate security policies with a secured facility. For example, a "choose one path from multiple paths" security policy could be implemented. Specifically, a specific user or group of users may be allowed to access many locations in a secured facility. However, during a given time frame, the user(s) only need to access one location of the multiple allowed locations. An array or table-like data structure could store multiple data structures 500 that define the permitted paths to each of these locations. Validation/analysis algorithms 253 may identify the initial doors/resources accessed by an end-user as recorded on the user's card 100 and compare those initial doors against the various data structures 500 in the array-like data structure thereby identifying the initial path taken by the user. From there, the respective access control device 200 can determine whether the current door is appropriate. Thus, once a user begins his/her way through the secured facility, the user is no longer allowed to go anywhere at anytime. Instead, the user must proceed to a specific location.

For example, a multi-path data structure could be defined as follows {PATH1:A,B,C,D,E; PATH2:A,F,G,H,I}. An end-user authorized to proceed through a secured facility according to such a multi-path definition could be required to begin at access point A. From there, the end-user can proceed either to access point B or access point F. If the user accesses point B, path 2 is no longer valid. Alternatively, if the user accesses point F, path 1 is no longer valid.

Also, a "one way" security policy may be defined in which a user is not allowed to "back track" within the secured facility thereby further limiting the ability of user's to traverse the secured facility at will. For example, access devices 200 may be programmed (e.g., by suitable rule definition for certain paths) to only allow access through access points according to the order of those access points in a permitted path definition. The permitted path structure can be extended by objected oriented programming, as an example, to define a path definition {OneWayPath:A,B,C,D,E . . . } for this purpose. The end-user can be allowed to only back track a limited number of nodes by including an integer parameter in the one way path data structure that defines the number of nodes that are permitted for "back tracking."

In some secured facilities, one or several "free paths" may be implemented to allow the end-user to return to one or several initial/primary validation points, to leave the facility under normal conditions, to exit the facility on an emergency basis, etc. Upon returning to one of the initial/primary validation points, the user can also be re-evaluated/re-validated by security personnel, the central security DB/server, etc. After re-validation, the respective user can then take a path to a different location (if desired). In some embodiments, a rule can be defined (as stored in access control cards, access control devices, and/or the central security database/server) that requires a user to return to a revalidation point after accessing specific identified resources.

Also, when end-users return to the initial/primary validation point (or any other point having a networked access control device 200), the control device 200 preferably reads log information from the end-user's card 100 and communicates the information to central DB/security server 303. Specifically, the log information written to the end-user's card by the various non-networked access control devices 200 are forwarded to the central DB/security server 303 for processing. The processing may include cryptographic processing, ECC processing, etc. Also, the processing may include analysis to identify aberrant behavior.

In some embodiments, an analysis of the log data is performed to determine "norm" behavior. The "norm" behavior may be performed to determine the common patterns for particular individual end-users, for particular classes of end-users, or for all end-users. The analysis may include determining the typical location(s) of end-users at particular times, the probability of one or several end-users being located at various locations, the typical minimum, average, maximum times spent at various locations, the typical minimum, average, maximum times spent traveling between locations, etc. The norms can be used to define the path information. Also, the norm information can be written to user card 100 and/or to access control devices 200 to allow the analysis of user access activities to be distributed throughout the secured facility 300. The norm information can be used to identify potentially inappropriate activities by end-users. The inappropriate activities need not necessarily be direct security-related issues. The processing may identify potentially poor job performance by personnel within the secured facility.

Figure 6:
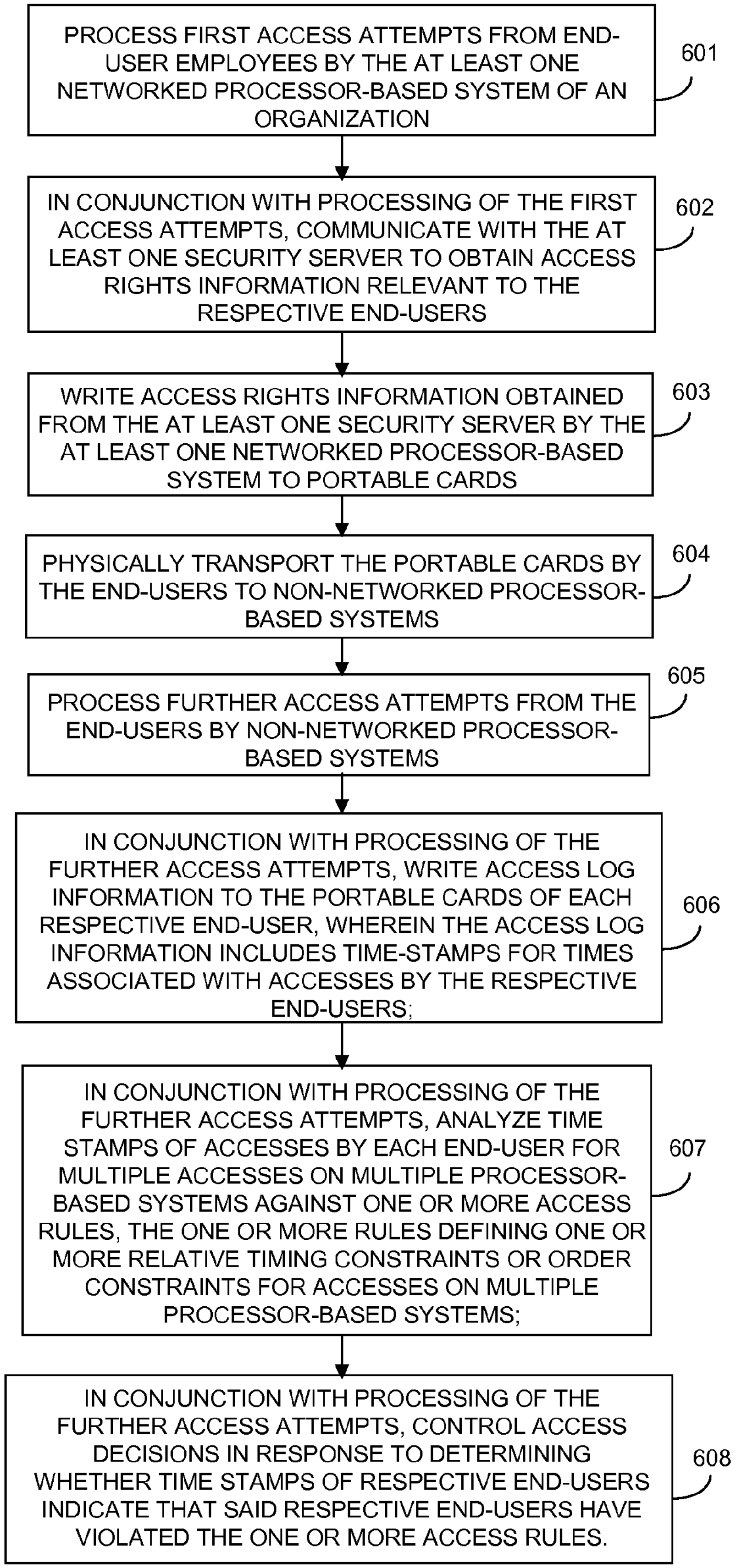
FIG. 6 depicts a flowchart of operations within a secured facility according to one representative embodiment.

FIG. 6 depicts a flowchart of operations within a secured facility according to one representative embodiment. In 601, first access attempts from end-user employees are processed by the at least one networked processor-based system of an organization. In 602, in conjunction with processing of the first access attempts, communication with the at least one security server to obtain access rights information relevant to the respective end-users occurs. In 603, access rights information obtained from the at least one security server by the at least one networked processor-based system is written to portable cards. In 604, the portable cards are physically transported by the end-users to non-networked processor-based systems.

In 605, further access attempts from the end-users are processed by non-networked processor-based systems. In 606, in conjunction with processing of the further access attempts, access log information is written to the portable cards of each respective end-user, wherein the access log information includes time-stamps for times associated with accesses by the respective end-users. In 607, in conjunction with processing of the further access attempts, time stamps of accesses by each end-user for multiple accesses on multiple processor-based systems are analyzed against one or more access rules, the one or more rules defining one or more relative timing constraints or order constraints for accesses on multiple processor-based systems. In 608, in conjunction with processing of the further access attempts, access decisions are controlled in response to determining whether the time stamps of respective end-users indicate that said respective end-users have violated the one or more access rules.

When implemented in software (e.g., software in the end-user access cards, access control devices, and/or the central security server), various elements or components of some representative embodiments are the code or software segments adapted to perform the respective tasks. The program or code segments can be stored in a computer readable medium, such as a processor readable medium, or transmitted by a computer data signal embodied in a carrier wave, or a signal modulated by a carrier, over a transmission medium. The "computer readable medium" may include any medium that can store or transfer information. Examples of the computer readable medium or memory include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, combinations thereof, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Although some representative embodiments and advantages have been described in detail, it should be understood that various changes, substitutions and alterations can be made herein without departing from the spirit and scope of the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure that processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method of controlling access within a system, the system comprising at least one security server for managing access rights and at least one networked processor-based system that processes access attempts to provide or deny access and multiple non-networked processor-based systems that process access attempts to provide or deny access, the method comprising:

processing first access attempts from end-users by the at least one networked processor-based system, wherein the first access attempts occur when the end-users are in physical proximity to the at least one networked processor-based system, wherein the end-users do not manage, control, or modify access rights within the system, wherein the end-users are employees of a common organization and the at least one security server maintains one or several databases that store data pertaining to the end-user employees of the common organization, networked and non-networked processor-based systems of the common organization, and access rights specific to the common organization;

in conjunction with processing of the first access attempts by the at least one networked processor-based system, communicating with the at least one security server to obtain access rights information relevant to the respective end-users;

writing access rights information obtained from the at least one security server by the at least one networked processor-based system to portable cards, wherein the portable cards respectively belong to end-users and store data identifying each respective end-user and data relevant to the access rights associated with each respective end-user;

physically transporting the portable cards by the end-users to non-networked processor-based systems;

processing further access attempts from the end-users by non-networked processor-based systems, wherein the further access attempts occur when the end-users are in physical proximity to the non-networked processor-based systems;

in conjunction with processing of the further access attempts by the non-networked processor-based systems, writing access log information to the portable cards of each respective end-user, wherein the access log information includes time-stamps for times associated with accesses by the respective end-users;

in conjunction with processing of the further access attempts by the non-networked processor-based systems, analyzing time stamps of accesses by each end-user for multiple accesses on multiple processor-based systems against one or more access rules, the one or more rules defining one or more relative timing constraints or order constraints for accesses on multiple processor-based systems; and in conjunction with processing of the further access attempts by the non-networked processor-based systems, controlling access decisions in response to determining whether the time stamps of respective end-users indicate that said respective end-users have violated the one or more access rules.

2. The method of claim 1 further comprising:

writing revocation data that revokes previously issued one or more access rights of said respective end-user when the time stamps of said respective end-user indicate that said respective end-user has violated the one or more access rules.

3. The method of claim 1 wherein access log information is stored on the portable card of the second-end user using a coding algorithm that includes redundancy within the written access log information such that some or all of the records of access are recoverable upon unauthorized erasure or modification of the written access log information.

4. The method of claim 3 wherein the coding algorithm applies a hamming distance to the written access log information.

5. The method of claim 3 wherein the written access log information is stored in multiple redundant portions.

6. The method of claim 1 further comprising: cryptographically processing the access log information for storage of the access log information on the portable card of the second end-user.

7. The method of claim 1 wherein the one or more rules define one or more timing constraints associated with accesses on multiple processor-based systems.

8. The method of claim 1, wherein information stored on the portable card of the end-user that identifies the end uses is a respective serial number that is correlated to the respective end-user by an entry in a database associated with the at least one security server.

9. A method of controlling access within a system, the system comprising at least one security server for managing access rights and at least one networked processor-based system that processes access attempts to provide or deny access and multiple non-networked processor-based systems that process access attempts to provide or deny access, the method comprising:

processing first access attempts from end-users by the at least one networked processor-based system, wherein the first access attempts occur when the end-users are in physical proximity to the at least one networked processor-based system, wherein the end-users do not manage, control, or modify access rights within the system, wherein the end-users are employees of a common organization and the at least one security server maintains one or several databases that store data pertaining to the end-user employees of the common organization, networked and non-networked processor-based systems of the common organization, and access rights specific to the common organization;

in conjunction with processing of the first access attempts by the at least one networked processor-based system, communicating with the at least one security server to obtain access rights information relevant to the respective end-users;

writing access rights information obtained to portable cards, wherein the portable cards respectively belong to end-users and store data identifying each respective end-user and data relevant to the access rights associated with each respective end-user;

physically transporting the portable cards by the end-users to non-networked processor-based systems;

processing further access attempts from the end-users by non-networked processor-based systems, wherein the further access attempts occur when the end-users are in physical proximity to the non-networked processor-based systems;

in conjunction with processing of the further access attempts by the non-networked processor-based systems, writing access log information to the portable cards of each respective end-user, wherein the access log information includes time-stamps for times associated with accesses by the respective end-users;

in conjunction with processing of the further access attempts by the non-networked processor-based systems, analyzing time stamps of accesses by each end-user for multiple accesses on multiple processor-based systems against one or more access rules, the one or more rules defining order constraints for accesses on multiple processor-based systems, the order constraints requiring prior accesses on two or more different processor-based systems in a specific pattern of access on the two or more different processor-based systems as a condition for allowing continued access; and in conjunction with processing of the further access attempts by the non-networked processor-based systems, controlling access decisions in response to determining whether the time stamps of respective end-users indicate that said respective end-users have violated the one or more access rules.

10. The method of claim 9 further comprising:

writing revocation data that revokes previously issued one or more access rights of said respective end-user when the time stamps of said respective end-user indicate that said respective end-user has violated the one or more access rules.

11. The method of claim 9 wherein access log information is stored on the portable card of the second-end user using a coding algorithm that includes redundancy within the written access log information such that some or all of the records of access are recoverable upon unauthorized erasure or modification of the written access log information.

12. The method of claim 11 wherein the coding algorithm applies a hamming distance to the written access log information.

13. The method of claim 11 wherein the written access log information is stored in multiple redundant portions.

14. The method of claim 9 further comprising: cryptographically processing the access log information for storage of the access log information on the portable card of the second end-user.

15. The method of claim 9 wherein the one or more rules define one or more timing constraints associated with accesses on multiple processor-based systems.

16. The method of claim 9, wherein information stored on the portable card of the end-user that identifies the end uses is a respective serial number that is correlated to the respective end-user by an entry in a database associated with the at least one security server.

* * * * *